United States Patent [19]

Menard et al.

[11] 4,016,959
[45] Apr. 12, 1977

[54] ACTUATOR FOR A RAIL WHEEL TREAD SCRUBBER BLOCK

[75] Inventors: Pierre R. Menard, l'Isle Adam; André Ledoux, Boulogne, both of France

[73] Assignee: Societe S A B, Saint-Cloud, France

[22] Filed: Feb. 13, 1976

[21] Appl. No.: 658,083

[30] Foreign Application Priority Data

Feb. 17, 1975 Sweden ............................. 7501707

[52] U.S. Cl. ............................. 188/196 B; 188/200
[51] Int. Cl.² ......................................... F16D 65/54
[58] Field of Search ...... 188/71.8, 79.5 GE, 196 B, 188/200, 203

[56] References Cited

UNITED STATES PATENTS

| | | | |
|---|---|---|---|
| 2,493,177 | 1/1950 | Williams | 188/196 B X |
| 2,522,181 | 9/1950 | Krikorian | 188/196 B X |
| 2,548,868 | 4/1951 | Christenot | 188/196 B X |

FOREIGN PATENTS OR APPLICATIONS 317,743  8/1929  United Kingdom ............ 188/196 B

*Primary Examiner*—Duane A. Reger
*Attorney, Agent, or Firm*—Laurence R. Brown

[57] ABSTRACT

Movement of a fluid pressure operated piston serves to engage a scrubber block with a railway wheel by means of motion of a piston rod. The piston rod is toothed to engage a take up mechanism for adjusting a clearance between the scrubber block and the wheel.

2 Claims, 4 Drawing Figures

ACTUATOR FOR A RAIL WHEEL TREAD SCRUBBER BLOCK

This invention relates to a fluid pressure controlled cylinder-piston unit, preferably intended for actuating a rail wheel tread scrubber block.

BACKGROUND OF THE INVENTION

In certain cases, for example at the use of disc brakes on railway vehicles, it is desirable to apply a scrubber block to a rail wheel tread from time to time in order to keep the tread clean and polished and thus to ensure constant and good adhesion conditions. It is then preferred to keep the slack between the scrubber block and the tread constant irrespective of the block wearing.

OBJECT OF THE INVENTION

The object of the invention is thus to accomplish a cylinder-piston unit of the kind defined, which is capable of keeping the said slack constant in a reliable way but which still is simple and cheap.

BRIEF DESCRIPTION OF THE INVENTION

This is according to the invention attained in that a piston rod attached to the piston of the unit is toothed and coacts with a toothed locking element so movably arranged in the cylinder that it will only follow the piston rod a distance forward in the application directing corresponding to the deisired slack between the block and the tread and lock the piston rod to the cylinder after a piston rod return movement corresponding to the said distance.

In a preferred embodiment the locking element is spring-biased against the piston rod and is arranged on a means movable the said distance in the said direction. The said means may be a pin extending through a longitudinal slot in the piston rod and arranged in slot-holes in lugs on a cylinder part.

Other embodiments are possible within the general idea to lock the piston rod after a return movement corresponding to the desired slack by means of a toothed locking element coacting with the toothed piston rod, which is attached to the piston, so that the latter will take a rest position further and further forward in the cylinder at the block wearing.

THE DRAWING

The invention will be described in further detail below, reference being made to the accompanying drawings, in which FIG. 1 is a partly sectional view of a unit according to the invention, FIG. 2 is a view substantially along the line II—II in FIG. 1 to a larger scale, and FIGS. 3 and 4 illustrate two modifications to a still larger scale.

DETAILED DESCRIPTION

Figure 1:
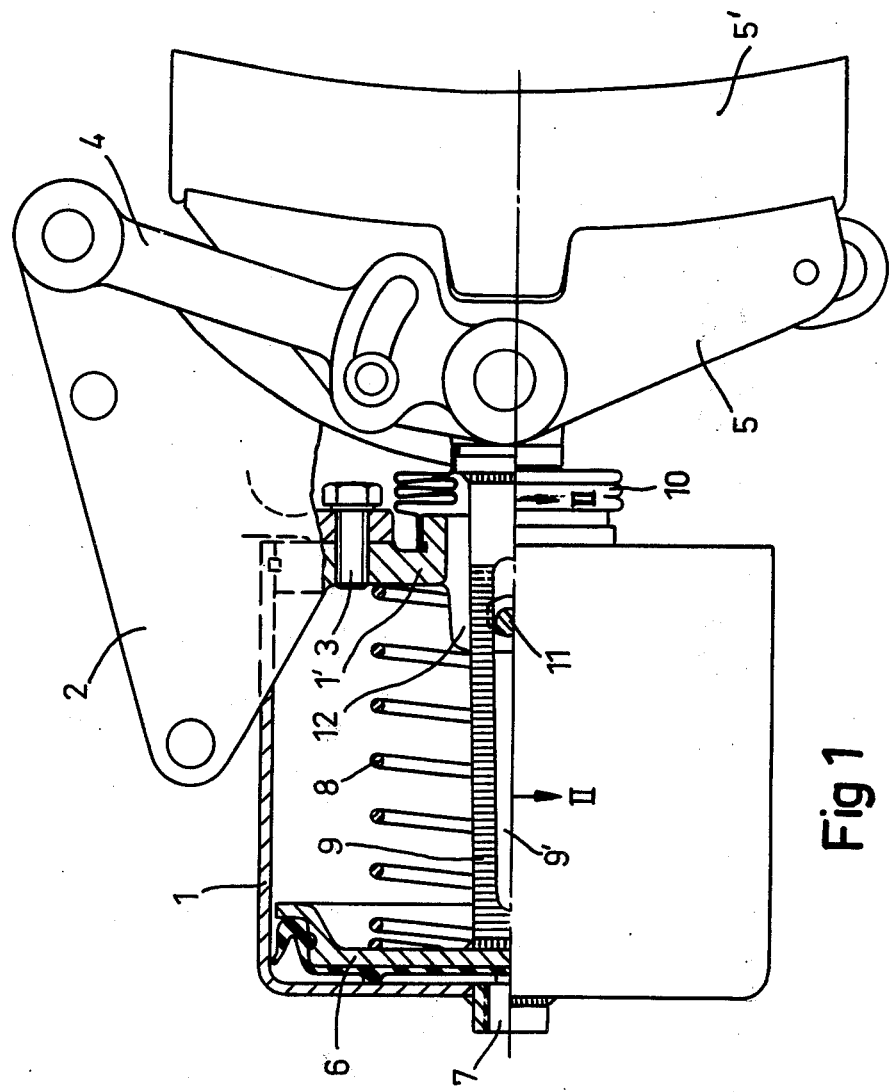
Figure 2:
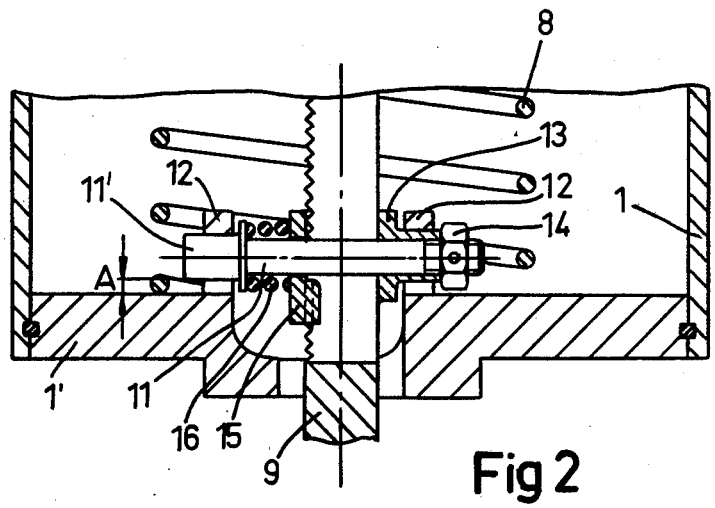

Referring to FIG. 1 and where appropriate to FIG. 2, a cylinder 1 with a fixed cylinder cover 1' is attached to a mounting bracket 2 by means of screws 3. The bracket 2 is to be attached to a railway vehicle underframe (not shown) and is provided with a pivotally attached suspension link 4 for a scrubber block head 5 with a scrubber block 5'.

A piston 6 is axially movable in the cylinder 1 under the influence of on the one hand fluid pressure admitted through an inlet 7 and on the other hand a return spring 8. A piston rod 9 is welded to the piston 6 and is pivotally attached to the scrubber block head 5. A rubber bellows 10 between the cylinder cover 1' and the piston rod 9 prevents dirt and water from entering the cylinder.

As appears from the drawings, the piston rod 9 is toothed on one side and is provided with an axial slot 9' through which extends a pin 11 held in two lugs 12 on the cylinder cover 1'. Each lug 12 is provided with a slot-hole with a width at least corresponding to the diameter of a pin head 11' (to the left in FIG. 2) and of a guiding sleeve 13 (to the right in FIG. 2) and a length corresponding to the said diameter plus a distance A, which is the desired slack between the scrubber block 5' and a wheel (not shown). A nut 14 is threaded on the pin 11 and locked in the shown position. A toothed locking element 15 is arranged on the pin 11 and is held against the toothed piston rod 9 by means of a spring 16 bearing against the pin head 11'.

By the interaction between the different parts the pin 11 will be held in the shown position under the influence of the return spring 8 when no fluid pressure is applied through the inlet 7. When fluid pressure is applied to the piston 6, the scrubber block 5' will be applied to the wheel (not shown). If the slack between the scrubber block and the wheel does not exceed the distance A, the pin 11 will move together with the piston rod 9 in its slot-holes in the lugs 12. If on the other hand the said slack exceeds the distance A, the locking element 15 has to slip on the piston rod 9 after the distance A has been passed. At the return movement under the influence of the return spring 8 the piston rod 9 will only move the distance A, as the locking element 15 will be held in engagement with the piston rod 9 under the influence of the spring 16, which is so dimensioned that the return spring 8 cannot force the piston rod 9 out of engagement with the locking element 15.

This means that the said slack will always correspond to the distance A but on the other hand that the rest position of the piston 6 will be moved further and further forward in the cylinder at the scrubber block wearing, so that more air under pressure will be needed, until the piston is brought back to its original position at the replacement of a worn-out scrubber block.

It is to be noted that due to the floating design of a pin 11 with associated parts a certain freedom is allowed for the piston rod 9.

Figure 3:
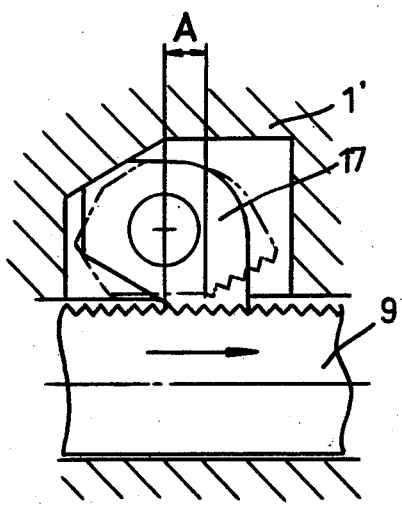
Figure 4:
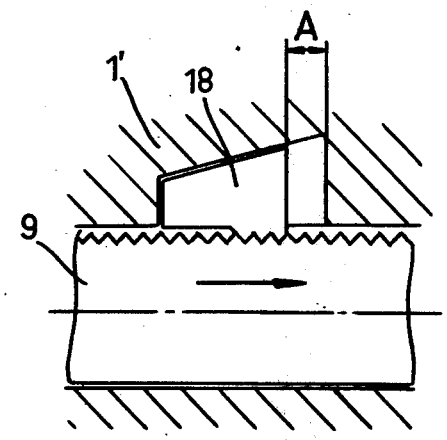

FIGS. 3 and 4 are schematic illustrations of two modifications within the scope of the invention. Only a locking element and its cooperation with a piston rod guided for movements in its axial direction is shown in each figure.

In the FIG. 3 modification a toothed locking element 7 is rockably mounted in a recess in the cylinder cover 1' for cooperation with the toothed piston rod 9. At the application movement of the piston rod in the direction of the arrow the locking element will rock in its counter-clockwise direction as viewed in FIG. 3, so that after exceeding the distance A the locking element will only drag on the piston rod. At the return movement the locking element 17 will immediately engage the piston rod 9 and will only permit a return movement corresponding to the distance A due to the interaction between the locking element and the cylinder cover recess as shown. A spring (not shown) may be provided to ensure that the locking element will engage the piston rod at the return movement.

In the FIG. 4 modification a toothed locking element 18 is arranged in a wedge shaped recess in the cylinder cover 1'. At the application movement of the toothed piston rod 9 the locking element 18 will follow the piston rod a distance A, whereupon it will be free to drag thereon due to the wedge shape of the recess. Only a piston rod return movement corresponding to the distance A will be permitted.

Other modifications are possible within the appended claims.

What is claimed is:

1. A fluid pressure controlled cylinder-piston unit for actuating a wheel contacting surface toward a rail wheel, comprising in combination, a cylinder, a piston movable forward in said cylinder under influence of fluid pressure and held in a return position by a spring, a piston rod movable with said piston having a toothed surface, and a locking element comprising a member spring biased against the piston rod teeth and movable with the piston rod positioned for locked engagement with the toothed surface to follow the piston rod during a forward stroke toward said wheel and to lock the piston rod relative to the cylinder on the return stroke after movement over a predetermined clearance distance between said wheel contacting surface and wheel wherein the piston rod defines a longitudinal slot and said locking element comprises a pin extending through said rod, whereby movement in said slot comprises said predetermined clearance distance.

2. A fluid pressure controlled cylinder-piston unit for actuating a wheel contacting surface toward a rail wheel, comprising in combination, a cylinder, a piston movable forward in said cylinder under influence of fluid pressure and held in a return position by a spring, a piston rod movable with said piston having a toothed surface, and a locking element positioned for locked engagement with the toothed surface to follow the piston rod during a forward stroke toward said wheel and to lock the piston rod relative to the cylinder on the return stroke after movement over a predetermined clearance distance between said wheel contacting surface and wheel wherein said locking element is wedge shaped and said cylinder defines a wedge shaped cavity mating with said element to permit a range of movement disengaging with the teeth on said rod during the forward stroke and reengaging upon the return stroke.

* * * * *